United States Patent
Liu et al.

(10) Patent No.: US 11,507,471 B2
(45) Date of Patent: Nov. 22, 2022

(54) METHOD, APPARATUS AND COMPUTER PROGRAM PRODUCT FOR MANAGING BACKUP SYSTEM

(71) Applicant: EMC IP Holding Company LLC, Hopkinton, MA (US)

(72) Inventors: Qin Liu, Chengdu (CN); Yi Jiang, Chengdu (CN); Jianxu Xu, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 297 days.

(21) Appl. No.: 16/835,539

(22) Filed: Mar. 31, 2020

(65) Prior Publication Data

US 2021/0117290 A1 Apr. 22, 2021

(30) Foreign Application Priority Data

Oct. 17, 2019 (CN) .......................... 201910986416.8

(51) Int. Cl.
| | |
|---|---|
| *G06F 12/00* | (2006.01) |
| *G06F 11/14* | (2006.01) |
| *G06N 3/04* | (2006.01) |
| *G06F 9/50* | (2006.01) |
| *H04L 43/0864* | (2022.01) |
| *H04L 43/0882* | (2022.01) |
| *G06F 11/30* | (2006.01) |

(52) U.S. Cl.
CPC ........ *G06F 11/1464* (2013.01); *G06F 9/5027* (2013.01); *G06F 11/1461* (2013.01); *G06F 11/1469* (2013.01); *G06F 11/3051* (2013.01); *G06N 3/04* (2013.01); *H04L 43/0864* (2013.01); *H04L 43/0882* (2013.01)

(58) Field of Classification Search
CPC ............. G06F 11/1464; G06F 11/1461; G06F 11/1469; G06F 11/3051; G06F 9/5027; G06F 3/0646; G06F 3/0647; G06F 3/065; G06N 3/04; H04L 43/0864; H04L 43/0882
See application file for complete search history.

(56) References Cited

U.S. PATENT DOCUMENTS 8,868,726 B1 * 10/2014 Tu ..................... H04L 29/08945
709/224
2020/0057697 A1 * 2/2020 Yeung ................. G06F 11/1466

* cited by examiner

*Primary Examiner* — Shawn X Gu
(74) *Attorney, Agent, or Firm* — Chamberlain, Hrdlicka, White, Williams & Aughtry

(57) ABSTRACT

Embodiments of the present disclosure provide a method, device, and computer program product for managing a backup system. The method comprises obtaining a state of a backup system, wherein the backup system comprises a plurality of backup servers and a plurality of backup clients, the plurality of backup servers is communicatively coupled to the plurality of backup clients via a network, and wherein at least one backup server from the plurality of backup servers is configured to back up data of at least one backup client allocated from the plurality of backup clients to the at least one backup server, determining a reward score corresponding to the state of the backup system and, determining, based on the state of the backup system and the reward score, configuration information for the backup system, the configuration information indicating allocation of the plurality of backup clients to the plurality of backup servers.

17 Claims, 7 Drawing Sheets

METHOD, APPARATUS AND COMPUTER PROGRAM PRODUCT FOR MANAGING BACKUP SYSTEM

CROSS-REFERENCE TO RELATED APPLICATIONS

This application claims priority to Chinese Application No. 201910986416.8 filed on Oct. 17, 2019. Chinese Application No. 201910986416.8 is hereby incorporated by reference in its entirety.

FIELD

Embodiments of the present disclosure generally relate to the field of data storage, and more specifically, to a method, device and computer program product for managing a backup system.

BACKGROUND

To avoid data loss, a backup system is often used for storing data. The backup system typically includes a backup server and a backup client, where the backup client is connected to the backup server via a network, and the backup server is used to back up data at the backup client.

In a large-scale backup system, there are often a plurality of backup servers and a plurality of backup clients, where each backup server is used to perform data backup on one or more backup clients allocated to the backup server. The plurality of backup servers may be interconnected to one another for backup client migration or other operations. The plurality of backup clients needs to be allocated appropriately to the plurality of backup servers to ensure the efficiency of data backup and improve the utilization of the backup server.

SUMMARY

Embodiments of the present disclosure provide a method, device and computer program product for managing a backup system.

In a first aspect of the present disclosure, there is provided a method of managing a backup system. The method comprises obtaining a state of a backup system, wherein the backup system comprises a plurality of backup servers and a plurality of backup clients, the plurality of backup servers are communicatively coupled to the plurality of backup clients via a network, and wherein at least one backup server from the plurality of backup servers is configured to back up data of at least one backup client allocated to the at least one backup server from the plurality of backup clients; determining a reward score corresponding to the state of the backup system; and determining, based on the state of the backup system and the reward score, configuration information for the backup system, the configuration information indicating allocation of the plurality of backup clients to the plurality of backup servers.

In a second aspect of the present disclosure, there is provided an electronic device. The electronic device comprises at least one processing unit and at least one memory. The at least one memory is coupled to the at least one processing unit and stores instructions for execution by the at least one processing unit. The instructions, when executed by the at least one processing unit, cause the device to perform acts comprising: obtaining a state of a backup system, wherein the backup system comprises a plurality of backup servers and a plurality of backup clients, the plurality of backup servers are communicatively coupled to the plurality of backup clients via a network, and wherein at least one backup server from the plurality of backup servers is configured to back up data of at least one backup client allocated to the at least one backup server from the plurality of backup clients; determining a reward score corresponding to the state of the backup system; and determining, based on the state of the backup system and the reward score, configuration information for the backup system, the configuration information indicating allocation of the plurality of backup clients to the plurality of backup servers.

In a third aspect of the present disclosure, there is provided a computer program product. The computer program product is tangibly stored on a non-transitory computer storage medium and includes machine-executable instructions. The machine-executable instructions, when executed by a device, cause the device to execute the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, features and advantages of the present disclosure will become more apparent, through the following detailed description on the example embodiments of the present disclosure with reference to the accompanying drawings in which the same reference symbols refer to the same components.

Throughout the drawings, the same or similar reference symbols refer to the same or similar elements.

DETAILED DESCRIPTION OF EMBODIMENTS

Figure 1:
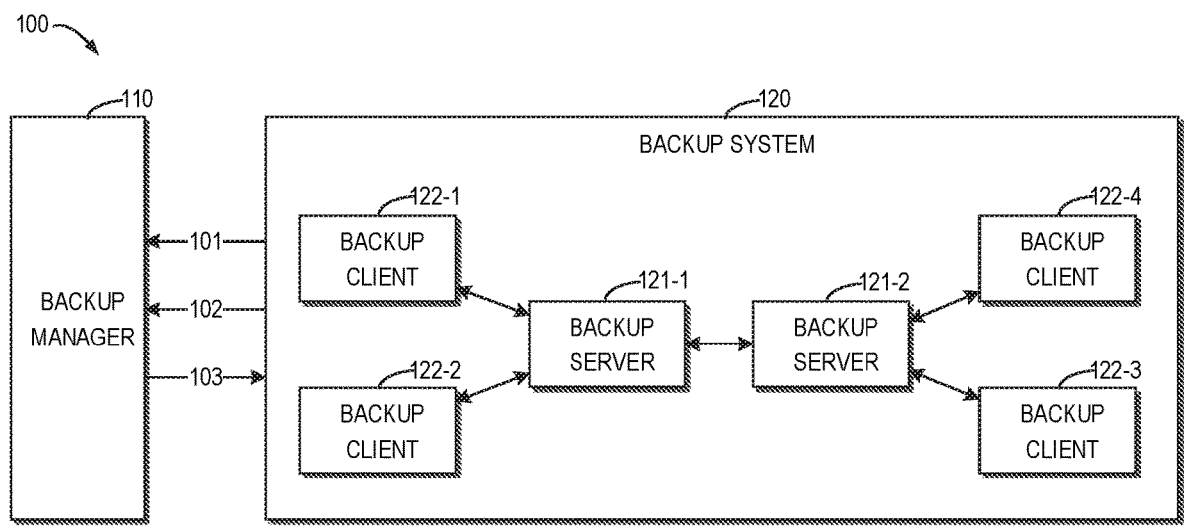
FIG. 1 illustrates a schematic diagram of an example environment in which embodiments of the present disclosure can be implemented.

Various embodiments of the present disclosure will now be described in more detail with reference to the drawings. Although certain embodiments of the present disclosure are illustrated in the drawings, it would be appreciated that the present disclosure may be implemented in various manners but cannot be limited by the embodiments as described herein. Rather, these embodiments are provided to disclose the present disclosure more thoroughly and completely, and to convey the scope of the present disclosure fully to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one other embodiment." The terms "first," "second," and the like may refer to different or same objects. Other definitions, explicit and implicit, may be included below.

As described above, in a large-scale backup system, there are often a plurality of backup servers and a plurality of backup clients, where each backup server is used to perform data backup on one or more backup clients allocated to the backup server. The plurality of backup servers may be interconnected to each other for backup client migration or other operations. The plurality of backup clients needs to be allocated appropriately to the plurality of backup servers to ensure the efficiency of data backup and improve the utilization of the backup server.

In traditional solutions, typically a system administrator manually configures allocation of a plurality of backup clients to a plurality of backup servers. However, the traditional solution often has the following restrictions: 1) the improper allocation of backup clients may cause the performance of some backups to be poor or even fail; 2) there are usually many factors in the backup system that may affect backup tasks, so management of the allocation of backup clients may consume a lot of human resources; 3) in many cases, the allocation of backup clients may be re-defined (for example, due to route changing of the network, addition of a new backup client or backup server, hardware upgrades of the backup server, and the like), resulting in the introduction of a lot of duplicated jobs.

Embodiments of the present disclosure provide a solution for managing a backup system to solve (or minimize) one or more of the above problems and one or more of other potential problems. In the various embodiments described below, a state of a backup system is obtained, where the backup system comprises a plurality of backup servers and a plurality of backup clients, the plurality of backup servers are communicatively coupled to the plurality of backup clients via a network, and at least one backup server from the plurality of backup servers is configured to back up data of at least one backup client allocated to the at least one backup server from the plurality of backup clients. A reward score corresponding to the state of the backup system is determined, which indicates an evaluation of the state of the backup system. In addition, configuration information for the backup system is determined based on the state of the backup system and the reward score by using a neural network. The configuration information indicates allocation of the plurality of backup clients to the plurality of backup servers. In this way, embodiments of the present disclosure can adjust, based on the state of the backup system, allocation of a plurality of backup clients to a plurality of backup servers in real time, thereby improving the performance of the backup system and reducing the management overhead of the backup system.

Hereinafter, reference will be made to the drawings to further describe embodiments of the present disclosure. FIG. 1 illustrates a block diagram of an example environment 100 in which embodiments of the present disclosure can be implemented. It is to be understood that the structure of the environment 100 is described merely as an example, without suggesting any limitation to the scope of the present disclosure.

As shown in FIG. 1, the environment 100 may include a backup manager 110 and a backup system 120. The backup manager 110, for example, may be implemented using any physical host, server, virtual machine, and the like. The backup system 120 may include a plurality of backup servers 121-1 and 121-2 (collectively referred to as "backup servers 121" or individually referred to as "backup server 121") and a plurality of backup clients 122-1, 122-2, 122-3, and 122-4 (collectively referred to as "backup clients 122" or individually referred to as "backup client 122"). The backup server 121 and/or backup client 122, for example, may be implemented using any physical host, server, virtual machine, and the like. It is to be understood that the number of the backup servers 121 and/or the number of the backup clients 122 in FIG. 1 are provided merely as an example, without suggesting any limitation to the present disclosure. In other embodiments, the backup system 120 may include different numbers of backup clients and/or backup servers.

The plurality of backup servers 121 may be communicatively coupled to the plurality of backup clients 122, where each backup server 121 is configured to back up data of one or more backup clients 122 allocated to the backup server 121. The plurality of backup servers 121 may be interconnected to each other for backup client migration or other operations. As shown in FIG. 1, for example, the backup clients 122-1 and 122-2 may be allocated to the backup server 121-1, while the backup clients 122-3 and 122-4 may be allocated to the backup server 121-2. That is, the backup server 121-1 may back up data from the backup clients 122-1 and 122-2, while the backup server 121-2 may back up data from the backup clients 122-3 and 122-4.

In some embodiments, the backup manager 110 may obtain a state 101 of the backup system 120. The state 101 of the backup system 120, for example, may include at least one of the following: respective states (each referred to as a "server state") of the backup servers 121, respective states (each referred to as a "client state") of the backup clients 122, and a network state.

In some embodiments, the state of a backup server 121, for example, may include at least one of the following: storage usage at the backup server 121, CPU usage at the backup server 121 (for example, during a data backup performed against one or more backup clients 122), memory usage at the backup server 121 (for example, during a data backup performed against one or more backup clients 122), input/output (I/O) operation usage at the backup server 121, and idle time of the backup server 121 within a historical time period (for example, in the past 24 hours).

In some embodiments, the state of a backup client 122, for example, may include at least one of the following: CPU usage at the backup client 122 (for example, during a data backup), RAM usage at the backup client 122 (for example, during a data backup), I/O operation usage at the backup client 122 (for example, during a data backup), the number of files at the backup client 122, a size of data at the backup client 122, average time of one or more data backups performed by the backup client 122 within a historical time period (for example, within the past 24 hours), and a success rate of the one or more data backups performed by the backup client 122 within the historical time period (for example, within the past 24 hours), and the like.

In some embodiments, the network state may include round-trip delay of the network and/or a network bandwidth available for data backup, and the like.

In some embodiments, the backup manager 110 may determine a reward score 102 for the state 101 of the backup system 120. The reward score 102, for example, may be a reward of the last allocation action (i.e., allocating the plurality of backup clients 122 to the plurality of backup servers 121) performed against the backup system 120, which may be derived from the state 101 of the backup system 120.

In some embodiments, the state 101 of the backup system 120 may indicate storage usage at each backup server 121 and idle time of each backup server 121 within a historical time period (for example, within the past 24 hours), average time and a success rate of one or more data backups performed by each backup client 122 within the historical time period (for example, within the past 24 hours). In some embodiments, the backup manager 110 may determine the reward score 102, based on the storage usage at each backup server 121, the idle time of each backup server 121 within the historical time period, the average time and the success rate of the one or more data backups performed by each backup client 122, for example, as shown by the formula (1) below:

$$R = \sum_{n=1}^{N} \left(\frac{P_n}{\log T_n}\right) + \sum_{m=1}^{M} \left(\frac{1}{\log TI_m} - U_m\right) \quad (1)$$

where M represents the number of backup servers; N represents the number of backup clients; $T_n$ represents the average time of one or more data backups performed by the $n^{th}$ backup client within a historical time period; $P_n$ represents a success rate of the one or more data backups performed by the $n^{th}$ backup client within the historical time period; $TI_m$ represents the total idle time of the $m^{th}$ backup server within the historical time period; and $U_m$ represents the storage usage at the $m^{th}$ backup server. As can be seen from the above formula (1), if the backup clients have higher backup success rates and less average backup time, and if the backup servers have less idle time, a higher reward score can be acquired. The reward score 102 can be used to measure the current state 101 of the backup system 120. Alternatively, in some other embodiments, the reward score 102 may also be determined based on other information indicated by the state 101 of the backup system 120.

In some embodiments, the backup manager 110 may determine, based on the state 101 of the backup system 120 and the reward score 102, configuration information 103 for the backup system 120. The configuration information 103 corresponds to an allocation action to be executed by the backup system 120. For example, the configuration information 103 may indicate allocation of the plurality of backup clients 122 to the plurality of backup servers 121. In the following, "configuration information" and "allocation action" can be used interchangeably. In some embodiments, the configuration information 103 may be represented by a 1*N array, where N represents the number of backup clients and each element in the array indicates that a target backup server to which each backup client is allocated. It is to be understood that N will be dynamically changed with the number of the backup clients. In some embodiments, the backup manager 103 may configure the configuration information 103 to the plurality of backup servers 121. The plurality of backup servers 121 may perform backup client migration based on the configuration information 103, as will be described below with reference to FIGS. 4A-4C.

In some embodiments, the backup manager 110 may determine, based on the state 101 of the backup system 120, the reward score 102 and by using a neural network, the allocation action 103 to be performed by the backup system 120. The neural network, for example, may be designed based on a Deep Deterministic Policy Gradient (DDPG) algorithm for implementing continuous control. The DDPG algorithm is designed based on a Deep Q Network (DQN), and can improve stability and convergence of the Actor-Critic network, making it more suitable for handling the management of a backup system.

Figure 2:
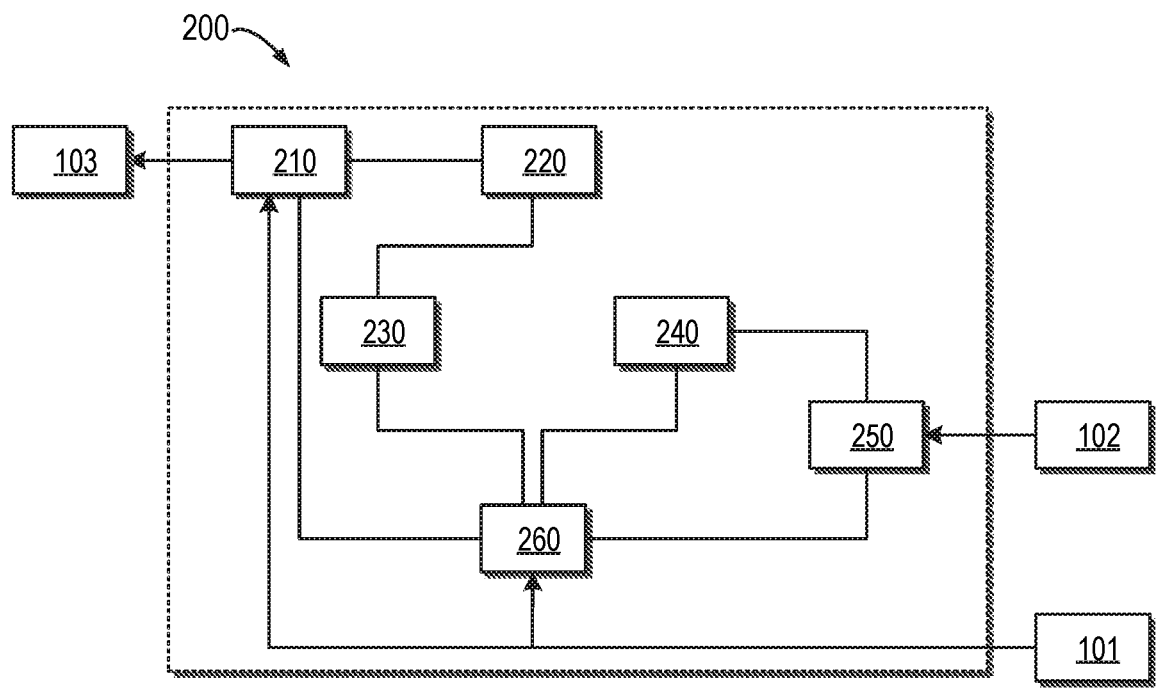
FIG. 2 illustrates a schematic block diagram of a neural network for managing a backup system according to embodiments of the present disclosure.

FIG. 2 illustrates a schematic block diagram of a neural network 200 for managing a backup system according to embodiments of the present disclosure. The neural network 200, for example, may be implemented at the backup manager 110 as shown in FIG. 1.

As shown in FIG. 2, the neural network 200 may generally include an actor network 210 and a critic network 260, both of which may receive the state 101 of the backup system 120. The actor network 210 and the critic network 260 may be coupled to each other. The neural network 200 may further include an action gradient module 220 and a policy gradient module 230, both of which are configured to update, based on an output of the critic network 260, a network parameter of the actor network 210. Hereinafter, the action gradient module 210 and the policy gradient module 230 may be collectively referred to as a "first sub-network" for updating the network parameter of the actor network 210. The neural network 200 may further include a Time Difference (TD) error module 240 and a target Q network 250, both of which are configured to update, based on an output of the critic network 260 and the reward score 102 corresponding to the state 101, a network parameter of the critic network 260. Hereinafter, the TD error module 240 and the target Q network 250 may be collectively referred to as a "second sub-network" for updating the network parameter of the critic network 260.

Figure 3A:
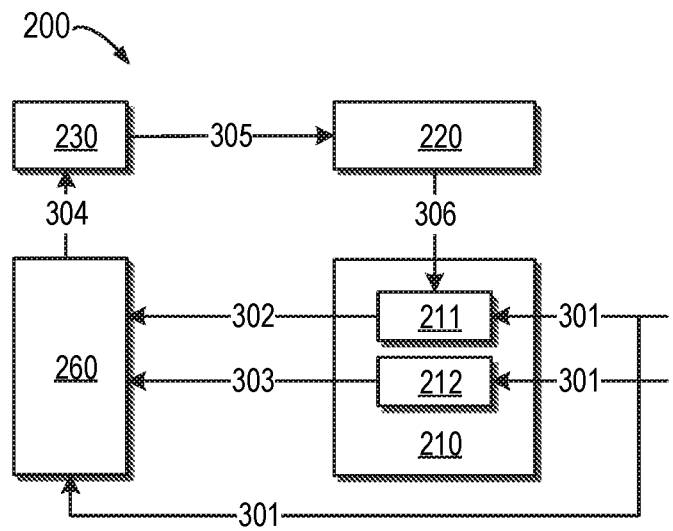
FIG. 3A illustrates a schematic diagram for training an actor network according to embodiments of the present disclosure.

FIG. 3A illustrates a schematic diagram for training the actor network 210 according to embodiments of the present disclosure. As shown in FIG. 3A, the actor network 210 may include an actor evaluation network 211 and an actor target network 212, where a network parameter of the actor evaluation network 211 (also referred to as a "first network parameter") may be updated with training of the actor network 210, and a network parameter of the actor target network 212 may usually be determined based on an empirical value and may be constant.

The actor evaluation network 211 and the actor target network 212 may receive a state 301 (for example, which can be the state 101 as shown in FIG. 1) of the backup system 120 at a current time. The actor evaluation network 211 may determine, based on the state 301 received at the current time and the first network parameter, an allocation action 302 at the current time. The actor target network 212 may determine, based on the state 301 obtained at the current time, a target allocation action 303 (which is also referred to as "target configuration information" herein) at the current time. The allocation action 302 and the target allocation action 303 may be provided to the critic network 260. The critic network 260 may generate, based on the allocation action 302, the target allocation action 303 and the state 301 of the backup system 120 at the current time, an evaluation 304 of the allocation action 302, and provide the evaluation 304 to the action gradient module 230. The action gradient module 230 may determine an action gradient 305 of the evaluation 304 relative to the allocation action 302, and provide the action gradient 305 to the policy gradient module 220. The policy gradient module 220 may determine a policy gradient 306 of the first network parameter relative to the allocation action 302, where the action gradient 305 decides a rising speed of the policy gradient. The policy gradient 306 may be used to update the network parameter (that is, the first network parameter) of the actor evaluation network 211, such that the actor evaluation network 211 can determine an allocation action at a next time, based on a state of the backup system 120 obtained at the next time (for example, after the allocation action 302 is applied to the backup system 120) and the updated first network parameter. During the training of the actor network 210, the policy gradient module 220 and the network parameter of the actor evaluation network 211 may be updated.

Figure 3B:
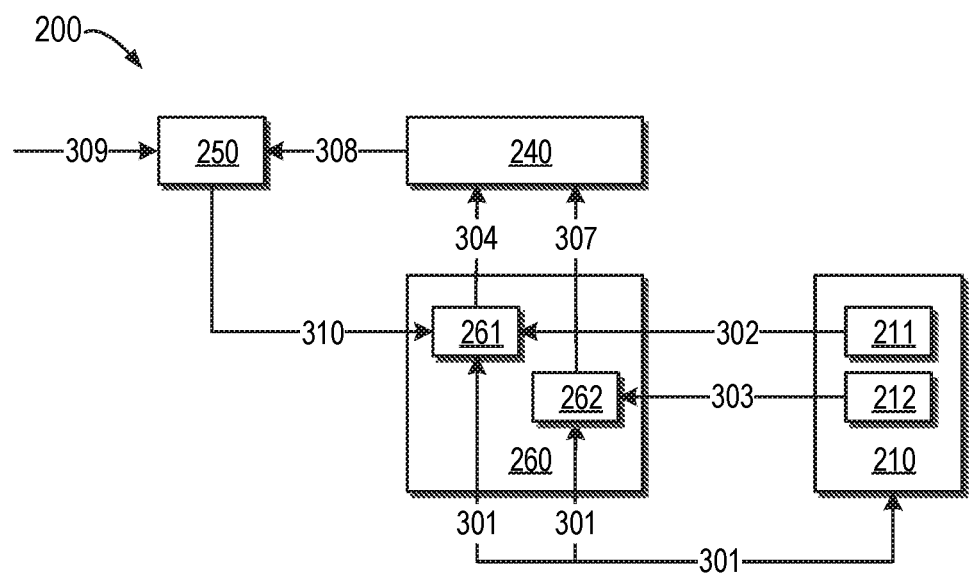
FIG. 3B illustrates a schematic diagram for training a critic network according to embodiments of the present disclosure.

FIG. 3B illustrates a schematic diagram for training the critic network 260 according to embodiments of the present disclosure. As shown in FIG. 3B, the critic network 260 may include a critic evaluation network 261 and a critic target network 262, where a network parameter (also referred to as a "second network parameter") of the critic evaluation network 261 may be updated with training of the critic network 260, and a network parameter of the critic target network 262 may usually be typically determined based on an empirical value and may be constant.

The critic evaluation network 261 may receive the allocation action 302 at the current time provided by the actor evaluation network 211, and determine the evaluation 304 of the backup action 302 based on the state 301 of the backup system 120 at the current time and the second network parameter. The critic target network 262 may receive a target allocation action 303 at the current time provided by the actor target network 212, and determine a target evaluation 307 of the target backup action 303 based on the state 301 of the backup system 120 at the current time. The evaluation 304 and the target evaluation 307 may be provided to the TD error module 240. The TD error module 240 may determine an error 308 between the evaluation 304 and the target evaluation 307, and provide the error 308 to the target Q network 250. The target Q network 250 may generate an output 310 based on a reward score 309 (for example, which can be the reward score 102 as shown in FIG. 1) corresponding to the state 301 and the error 308, to update the network parameter (i.e., the second network parameter) of the critic evaluation network 216, such that the critic evaluation network 216 can determine, based on a state of the backup system 120 obtained at a next time (for example, after the allocation action 302 is applied to the backup system 120) and the updated second network parameter, an evaluation of an allocation action at the next time provided by the actor evaluation network 211. During the training of the critic network 260, the network parameters of the TD error module 240, the target Q network 250 and the critic evaluation network 216 may be updated.

In this way, by training the actor network 210 and the critic network 216, the neural network 200 as shown in FIG. 2 can automatically adjust, based on the obtained state of the backup system 120, configuration information (i.e., an allocation action) for the backup system 120 in real time, thereby improving the performance of the backup system 120. Since many manual operations for managing a backup system are replaced by artificial intelligence, the management overhead of the backup system 120 can be reduced significantly.

Figure 4A:
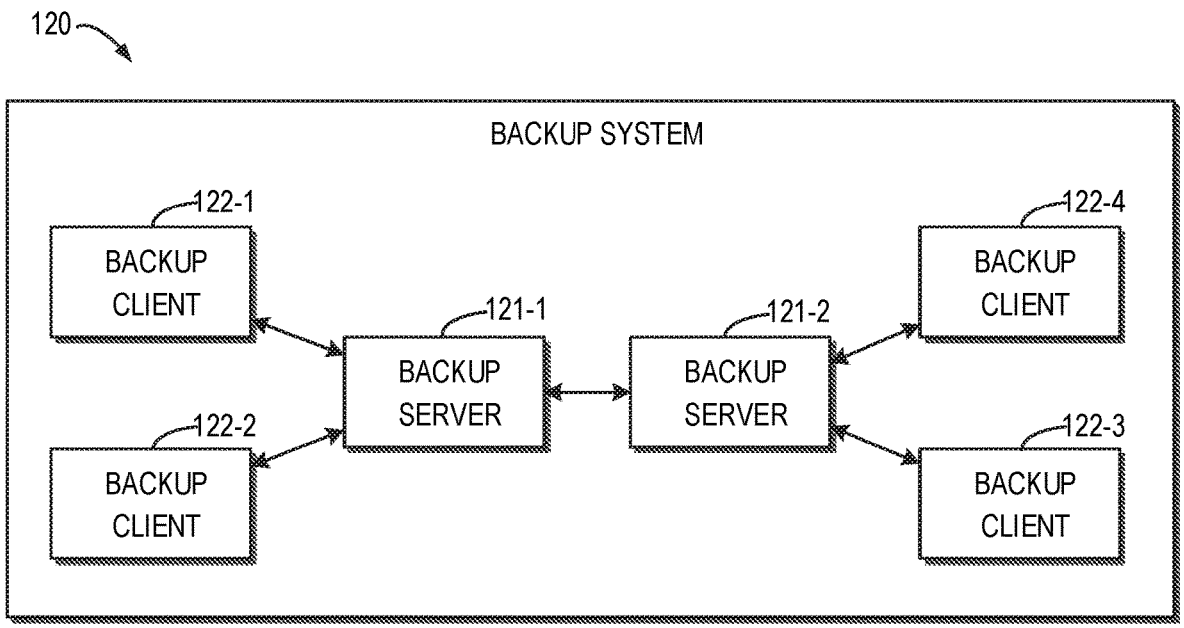
FIGS. 4A-4C illustrate schematic diagrams of migration of a plurality of backup clients among a plurality of backup servers according to embodiments of the present disclosure.
Figure 4B:
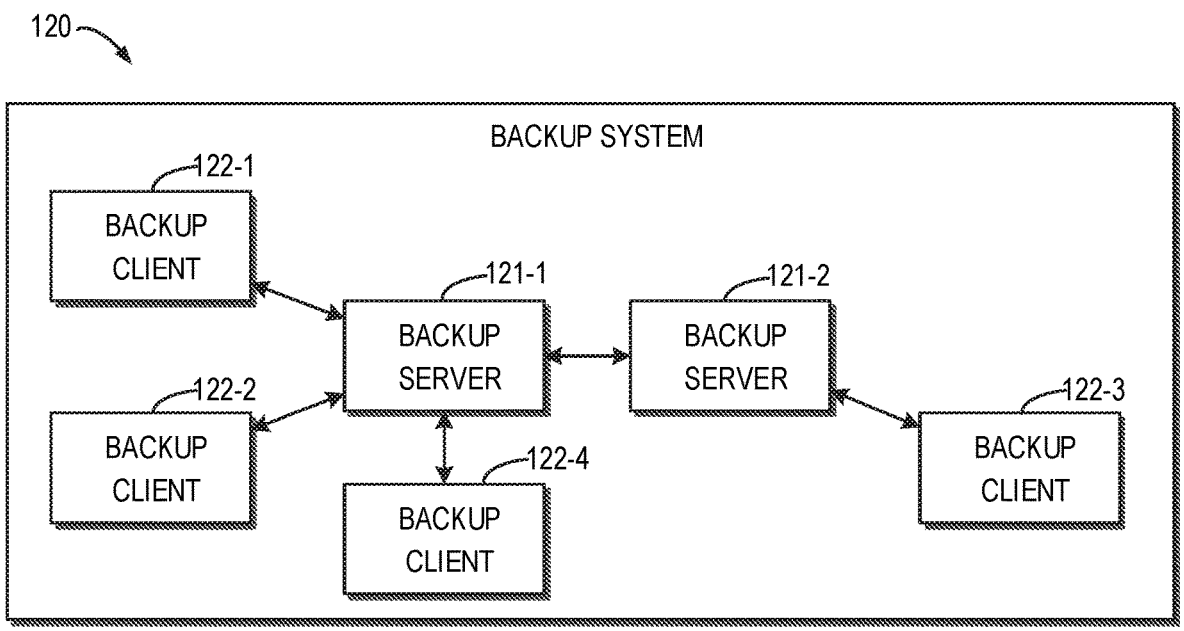
Figure 4C:
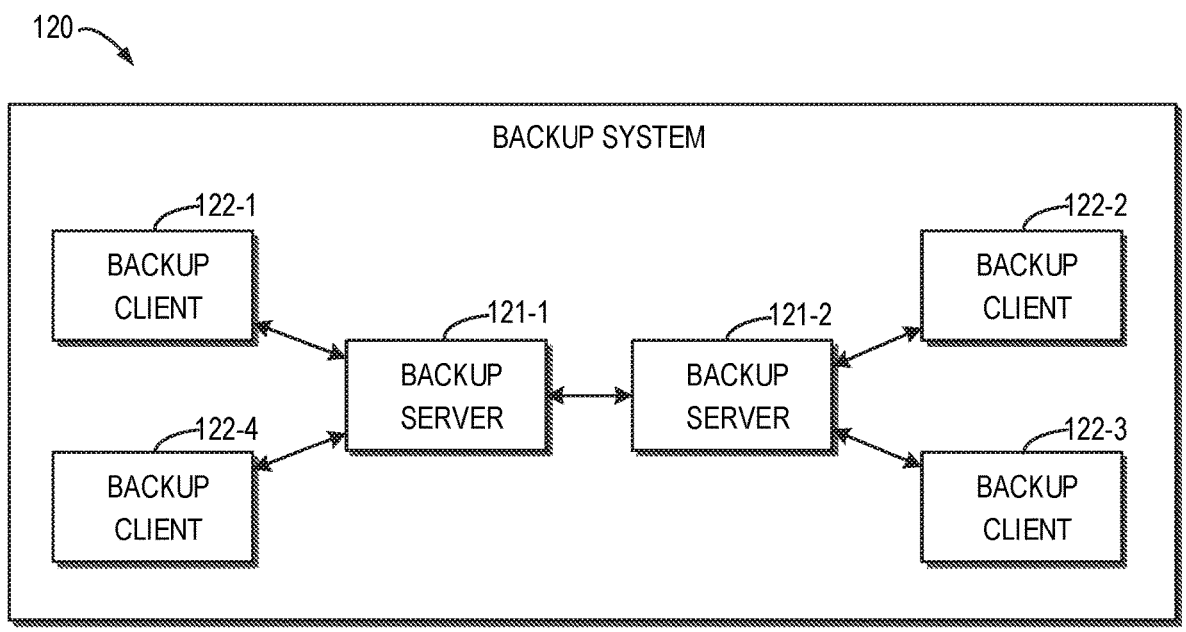

FIGS. 4A-4C illustrate schematic diagrams of migration of a plurality of clients among a plurality of backup servers according to embodiments of the present disclosure. FIGS. 4A-4C each illustrate the backup system 120 as shown in FIG. 1, which, for example, includes the two backup servers 121-1 and 121-2 and the four backup clients 122-1, 122-2, 122-3 and 122-4. It is assumed for purposes of the example that the backup clients 122-1 and 122-2 are medium-sized database clients. A data backup for this type of backup clients may occupy a relatively small storage space of the backup server but exhibits a relatively slow backup speed. It is assumed here that the backup clients 122-3 and 122-4 are large-scale storage file system clients. A data backup for this type of backup clients may occupy a relatively large storage space of the backup server but exhibit a relatively high backup speed.

In an initial state as shown in FIG. 4A, the backup clients 122-1 and 122-2 are allocated to the backup server 121-1, while the backup clients 122-3 and 122-4 are allocated to the backup server 121-2. In this case, the backup server 121-1 may have a long occupancy time and low storage space usage. The backup server 121-2 may have a short occupancy time and high storage space usage. At this time, the backup manager 110, for example, may obtain the above state of the backup system 120, and determine, based on the state and an evaluation of the state (for example, a reward score corresponding to the state), configuration information to be applied to the backup system 120.

Then, the backup manager 110 may apply the determined configuration information to the backup system 120. For example, as shown in FIG. 4B, the backup client 122-4 is migrated from the backup server 121-2 to the backup server 122-1. In the case, the storage space usage of the backup server 121-1 may increase while the storage space usage of the backup server 120-2 may decrease, so that the storage space usage of the backup system can be balanced. However, the occupation time of the backup server 121 is too long, and the occupation time of the backup server 121-2 is too short. At this time, the backup manager 110, for example, may obtain the above state of the backup system 120, and re-determine, based on the state and a reward score corresponding to the state, configuration information to be applied to the backup system 120.

Finally, the backup manager 110 may apply the determined configuration information to the backup system 120. For example, as shown in FIG. 4C, the backup client 122-2 is migrated from the backup server 121-1 to the backup client 121-2, to enable reasonable storage space usage and occupancy time for both of the backup servers 121-1 and 121-2. The backup manager 110, for example, may obtain the above state of the backup system 120, and determine that the above state corresponds to a higher reward score. As such, the performance of the backup system 120 is optimized.

Figure 5:
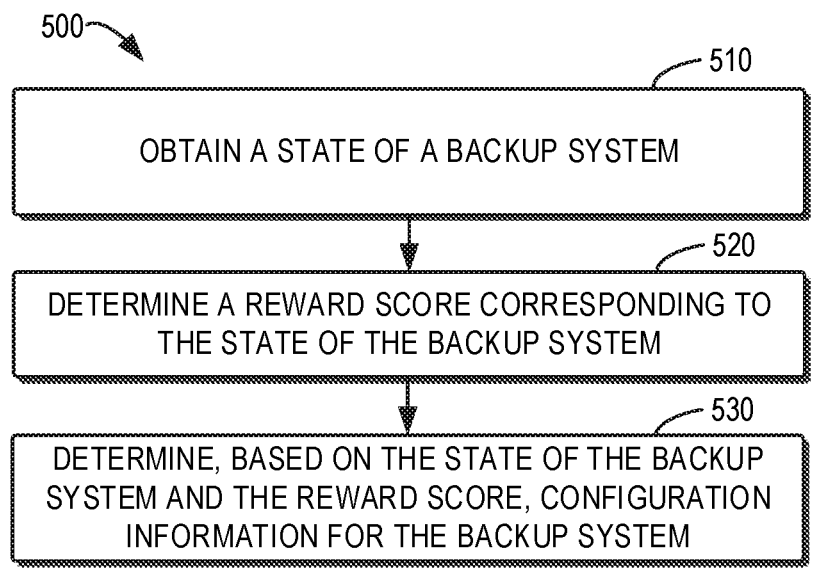
FIG. 5 illustrates a flowchart of an example method for managing a backup system according to embodiments of the present disclosure.

FIG. 5 illustrates a flowchart of an example method 500 of managing a backup system according to embodiments of the present disclosure. For example, the method 500 may be performed by the backup manager 110 as shown in FIG. 1. The method 500 will be described below with reference to FIG. 1. It is to be understood that the method 500 may include additional actions not shown and/or may omit some actions shown, and the scope of the present disclosure is not limited in this regard.

At block 510, the backup manager 110 obtains a state of a backup system, where the backup system comprises a plurality of backup servers and a plurality of backup clients, the plurality of backup servers are communicatively coupled to the plurality of backup clients via a network, and at least one backup server from the plurality of backup servers is configured to back up data of at least one backup client allocated to the at least one backup server from the plurality of backup clients.

In some embodiments, the state of the backup system comprises at least one of the following: respective server states of the plurality of backup servers; respective client states of the plurality of backup clients; and a network state of the network.

In some embodiments, a server state of a backup server from the plurality of backup servers comprises at least one of the following: storage usage at the backup server; CPU usage at the backup server; memory usage at the backup server; input/output operation usage at the backup server; and idle time of the backup server within a historical time period.

In some embodiments, a client state of a backup client from the plurality of backup clients comprises at least one of the following: CPU usage at the backup client; memory usage at the backup client; input/output operation usage at the backup client; the number of files at the backup client; a size of data at the backup client; average time of one or more data backups performed by the backup client within a historical time period; and a success rate of the one or more data backups performed by the backup client within the historical time period.

In some embodiments, the network state comprises at least one of the following: round-trip delay of the network; and an available network bandwidth of the network.

At block 520, the backup manager 110 determines a reward score corresponding to the state of the backup system. The reward score may indicate an evaluation of the state of the backup system.

In some embodiments, the state of the backup system indicates idle time of each of the plurality of backup servers within a historical time period, storage usage at each of the plurality of backup servers, average time and a success rate of one or more data backups performed by each of the plurality of backup clients within the historical time period. In some embodiments, determining the reward score comprises: determining the reward score based on the idle time of each of the plurality of backup servers within the historical time period, the storage usage at each of the plurality of backup servers, the average time and the success rate of one or more data backups performed by each of the plurality of backup clients within the historical time period.

At block 530, the backup manager 110 determines, based on the state of the backup system and the reward score, configuration information for the backup system, the configuration information indicating allocation of the plurality of backup clients to the plurality of backup servers.

In some embodiments, determining the configuration information comprises: determining, based on the state of the backup system and the reward score, the configuration information using a neural network.

In some embodiments, the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network.

In some embodiments, the actor evaluation network is configured to determine, based on the state of the backup system obtained at a current time and the first network parameter of the actor evaluation network, the configuration information for the backup system at the current time, the configuration information being provided to the critic evaluation network.

In some embodiments, the actor target network is configured to determine, based on the state of the backup system obtained at the current time, target configuration information for the backup system at the current time, the target configuration information being provided to the critic target network.

In some embodiments, the critic evaluation network is configured to determine, based on the state of the backup system obtained at the current time and the second network parameter of the critic evaluation network, an evaluation of the configuration information, the evaluation being provided to the first sub-network and the second sub-network.

In some embodiments, the critic target network is configured to determine, based on the state of the backup system obtained at the current time, a target evaluation of the target configuration information, the target evaluation being provided to the second sub-network.

In some embodiments, the first sub-network is configured to update the first network parameter based on the evaluation.

In some embodiments, the second sub-network is configured to update the second network parameter based on the reward score and a difference between the evaluation and the target evaluation.

Figure 6:
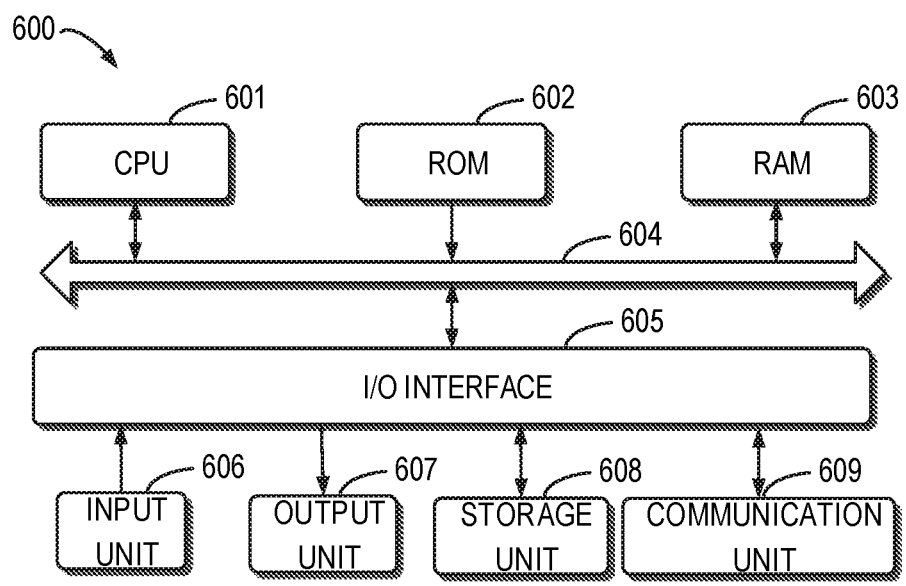
FIG. 6 illustrates a schematic block diagram of an example device that can be used to implement embodiments of the present disclosure.

FIG. 6 illustrates a block diagram of an example device 600 that can be used to implement embodiments of the present disclosure. For example, the backup manager 110 as shown in FIG. 1 may be implemented by the device 600. As shown in FIG. 6, the device 600 includes a central processing unit (CPU) 601 which performs various appropriate actions and processing, based on computer program instructions stored in a read-only memory (ROM) 602 or computer program instructions loaded from a storage unit 508 to a random access memory (RAM) 603. The memory 603 stores therein various programs and data required for operations of the device 600. The CPU 601, the ROM 602 and the memory 603 are connected via a bus 604 with one another. An input/output (I/O) interface 605 is also connected to the bus 604.

The following components in the device 600 are connected to the I/O interface 605: an input unit 606 such as a keyboard, a mouse and the like; an output unit 607 including various kinds of displays and a loudspeaker, etc.; a storage page 608 such as a magnetic disk, an optical disk, and etc.; a communication unit 609 including a network card, a modem, and a wireless communication transceiver, etc. The communication unit 609 allows the device 600 to exchange information/data with other devices through a computer network such as the Internet and/or various kinds of telecommunications networks.

Various processes and processing described above, e.g., the method 500, may be executed by the processing unit 601. For example, in some embodiments, the method 500 may be implemented as a computer software program that is tangibly included in a machine readable medium, e.g., the storage page 608. In some embodiments, part or all of the computer programs may be loaded and/or mounted onto the device 600 via ROM 602 and/or communication unit 609. When the computer program is loaded to the RAM 603 and executed by the CPU 601, one or more steps of the method 500 as described above may be executed.

The present disclosure may be a method, device, system, and/or computer program product. The computer program product may include a computer-readable storage medium having computer-readable program instructions thereon for carrying out aspects of the present disclosure.

The computer-readable storage medium may be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, device (systems), and computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor unit of a general purpose computer, special purpose computer, or other programmable data processing device to produce a machine, such that the instructions, when executed via the processing unit of the computer or other programmable data processing device, create means for implementing the functions/actions specified in the flowchart and/or block diagram block or blocks. These computer-readable program instructions may also be stored in a computer-readable storage medium that can direct a computer, a programmable data processing device, and/or other devices to function in a particular manner, such that the computer-readable storage medium having instructions stored therein includes an article of manufacture including instructions which implement aspects of the function/action specified in the flowchart and/or block diagram block or blocks.

The computer-readable program instructions may also be loaded onto a computer, other programmable data processing device, or other devices to cause a series of operational steps to be performed on the computer, other programmable devices or other device to produce a computer implemented process, such that the instructions which are executed on the computer, other programmable device, or other devices implement the functions/actions specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those skilled in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A method of managing a backup system, comprising:
obtaining a state of a backup system, wherein the backup system comprises a plurality of backup servers and a plurality of backup clients, the plurality of backup servers is communicatively coupled to the plurality of backup clients via a network, and wherein at least one backup server of the plurality of backup servers is configured to back up data of at least one backup client from the plurality of backup clients allocated to the at least one backup server,
wherein the state of the backup system indicates idle time of each of the plurality of backup servers within a historical time period, storage usage at each of the plurality of backup servers, average time and a success rate of one or more data backups performed by each of the plurality of backup clients within the historical time period;
determining a reward score corresponding to the state of the backup system based on the idle time of each of the plurality of backup servers within the historical time period, the storage usage at each of the plurality of backup servers, the average time and the success rate of the one or more data backups performed by each of the plurality of backup clients within the historical time period; and
determining, based on the state of the backup system and the reward score, configuration information for the backup system, the configuration information indicating allocation of the plurality of backup clients to the plurality of backup servers.

2. The method of claim 1, wherein the state of the backup system comprises at least one of the following:
respective server states of the plurality of backup servers;
respective client states of the plurality of backup clients; and
a network state of the network.

3. The method of claim 2, wherein a server state of a backup server from the plurality of backup servers comprises at least one of the following:
storage usage of the backup server;
CPU usage of the backup server;
memory usage of the backup server;
input/output operation usage of the backup server; and
idle time of the backup server within a historical time period.

4. The method of claim 2, wherein a client state of a backup client from the plurality of backup clients comprises at least one of the following:
CPU usage of the backup client;
memory usage of the backup client;
input/output operation usage of the backup client;
a number of files of the backup client;
a size of data at the backup client;
the average time of the one or more data backups performed by the backup client within the historical time period; and
the success rate of the one or more data backups performed by the backup client within the historical time period.

5. The method of claim 2, wherein the network state comprises at least one of the following:
round-trip delay of the network; and
an available network bandwidth of the network.

6. The method of claim 1, wherein determining the configuration information comprises:
determining, based on the state of the backup system and the reward score, the configuration information using a neural network.

7. The method of claim 6, wherein the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network, and wherein:
the actor evaluation network is configured to determine, based on the state of the backup system obtained at a current time and the first network parameter of the actor evaluation network, the configuration information for the backup system at the current time, the configuration information being provided to the critic evaluation network;
the actor target network is configured to determine, based on the state of the backup system obtained at the current time, target configuration information for the backup system at the current time, the target configuration information being provided to the critic target network;
the critic evaluation network is configured to determine, based on the state of the backup system obtained at the current time and the second network parameter of the critic evaluation network, an evaluation of the configuration information, the evaluation being provided to the first sub-network and the second sub-network;
the critic target network is configured to determine, based on the state of the backup system obtained at the current time, a target evaluation of the target configuration information, the target evaluation being provided to the second sub-network;
the first sub-network is configured to update the first network parameter based on the evaluation; and
the second sub-network is configured to update the second network parameter based on the reward score and a difference between the evaluation and the target evaluation.

8. An electronic device comprising:
at least one processing unit;
at least one memory coupled to the at least one processing unit and storing instructions for execution by the at least one processing unit, the instructions, when executed by the at least one processing unit, causing the device to perform acts comprising:
obtaining a state of a backup system, wherein the backup system comprises a plurality of backup servers and a plurality of backup clients, the plurality of backup servers is communicatively coupled to the plurality of backup clients via a network, and wherein at least one backup server of the plurality of backup servers is configured to back up data of at least one backup client from the plurality of backup clients allocated to the at least one backup server,
wherein the state of the backup system indicates idle time of each of the plurality of backup servers within a historical time period, storage usage at each of the plurality of backup servers, average time and a success rate of one or more data backups performed by each of the plurality of backup clients within the historical time period;

determining a reward score corresponding to the state of the backup system based on the idle time of each of the plurality of backup servers within the historical time period, the storage usage at each of the plurality of backup servers, the average time and the success rate of the one or more data backups performed by each of the plurality of backup clients within the historical time period; and determining, based on the state of the backup system and the reward score, configuration information for the backup system, the configuration information indicating allocation of the plurality of backup clients to the plurality of backup servers.

9. The electronic device of claim 8, wherein the state of the backup system comprises at least one of the following:
respective server states of the plurality of backup servers;
respective client states of the plurality of backup clients; and
a network state of the network.

10. The electronic device of claim 9, wherein a server state of a backup server from the plurality of backup servers comprises at least one of the following:
storage usage of the backup server;
CPU usage of the backup server;
memory usage of the backup server;
input/output operation usage of the backup server; and
idle time of the backup server within a historical time period.

11. The electronic device of claim 9, wherein a client state of a backup client from the plurality of backup clients comprises at least one of the following:
CPU usage of the backup client;
memory usage of the backup client;
input/output operation usage of the backup client;
a number of files of the backup client;
a size of data of the backup client;
the average time of the one or more data backups performed by the backup client within the historical time period; and
the success rate of the one or more data backups performed by the backup client within the historical time period.

12. The electronic device of claim 9, wherein the network state comprises at least one of the following:
round-trip delay of the network; and
an available network bandwidth of the network.

13. The electronic device of claim 8, wherein determining the configuration information comprises:
determining, based on the state of the backup system and the reward score, the configuration information using a neural network.

14. The electronic device of claim 13, wherein the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network, and wherein:
the actor evaluation network is configured to determine, based on the state of the backup system obtained at a current time and the first network parameter of the actor evaluation network, the configuration information for the backup system at the current time, the configuration information being provided to the critic evaluation network;
the actor target network is configured to determine, based on the state of the backup system obtained at the current time, target configuration information for the backup system at the current time, the target configuration information being provided to the critic target network;
the critic evaluation network is configured to determine, based on the state of the backup system obtained at the current time and the second network parameter of the critic evaluation network, an evaluation of the configuration information, the evaluation being provided to the first sub-network and the second sub-network;
the critic target network is configured to determine, based on the state of the backup system obtained at the current time, a target evaluation of the target configuration information, the target evaluation being provided to the second sub-network;
the first sub-network is configured to update the first network parameter based on the evaluation; and
the second sub-network is configured to update the second network parameter based on the reward score and a difference between the evaluation and the target evaluation.

15. A computer program product tangibly stored on a non-transitory computer storage medium and including machine-executable instructions which cause, when executed by a device, the device to execute a method, the method comprising:
obtaining a state of a backup system, wherein the backup system comprises a plurality of backup servers and a plurality of backup clients, the plurality of backup servers is communicatively coupled to the plurality of backup clients via a network, and wherein at least one backup server of the plurality of backup servers is configured to back up data of at least one backup client from the plurality of backup clients allocated to the at least one backup server,
wherein the state of the backup system indicates idle time of each of the plurality of backup servers within a historical time period, storage usage at each of the plurality of backup servers, average time and a success rate of one or more data backups performed by each of the plurality of backup clients within the historical time period;
determining a reward score corresponding to the state of the backup system based on the idle time of each of the plurality of backup servers within the historical time period, the storage usage at each of the plurality of backup servers, the average time and the success rate of the one or more data backups performed by each of the plurality of backup clients within the historical time period; and
determining, based on the state of the backup system and the reward score, configuration information for the backup system, the configuration information indicating allocation of the plurality of backup clients to the plurality of backup servers.

16. The computer program product of claim 15, wherein determining the configuration information comprises:
determining, based on the state of the backup system and the reward score, the configuration information using a neural network.

17. The computer program product of claim 16, wherein the neural network comprises an actor network and a critic network, the actor network comprises an actor evaluation network and an actor target network, the critic network comprises a critic evaluation network and a critic target network, and the neural network further comprises a first sub-network for updating a first network parameter of the actor evaluation network and a second sub-network for updating a second network parameter of the critic evaluation network, and wherein:

the actor evaluation network is configured to determine, based on the state of the backup system obtained at a current time and the first network parameter of the actor evaluation network, the configuration information for the backup system at the current time, the configuration information being provided to the critic evaluation network;

the actor target network is configured to determine, based on the state of the backup system obtained at the current time, target configuration information for the backup system at the current time, the target configuration information being provided to the critic target network;

the critic evaluation network is configured to determine, based on the state of the backup system obtained at the current time and the second network parameter of the critic evaluation network, an evaluation of the configuration information, the evaluation being provided to the first sub-network and the second sub-network;

the critic target network is configured to determine, based on the state of the backup system obtained at the current time, a target evaluation of the target configuration information, the target evaluation being provided to the second sub-network;

the first sub-network is configured to update the first network parameter based on the evaluation; and the second sub-network is configured to update the second network parameter based on the reward score and a difference between the evaluation and the target evaluation.

\* \* \* \* \*